United States Patent [19]
Morton et al.

[11] Patent Number: 5,731,883
[45] Date of Patent: Mar. 24, 1998

[54] APPARATUS AND METHOD FOR PRODUCING INTEGRAL IMAGE ELEMENTS

[75] Inventors: Roger Roy Adams Morton, Penfield; Roy Yuille Taylor, Scottsville, both of N.Y.

[73] Assignee: Eastman Kodak Company, Rochester, N.Y.

[21] Appl. No.: 629,816

[22] Filed: Apr. 10, 1996

[51] Int. Cl.$^6$ .................................................. H04N 1/393
[52] U.S. Cl. ........................... 358/451; 358/401; 358/296
[58] Field of Search ........................ 358/451, 448, 358/504, 406, 401, 501, 296, 445; 345/22, 77; 347/241, 244, 256; 430/946

[56] References Cited

U.S. PATENT DOCUMENTS

| | | | |
|---|---|---|---|
| 4,158,501 | 6/1979 | Smith et al. | 355/77 |
| 4,276,478 | 6/1981 | Meszaros et al. | 250/468 |
| 4,668,080 | 5/1987 | Gale et al. | 355/51 |
| 4,757,350 | 7/1988 | Street | 355/22 |
| 5,004,335 | 4/1991 | Montes | 352/58 |
| 5,028,950 | 7/1991 | Fritsch | 355/22 |
| 5,034,982 | 7/1991 | Heninger et al. | 350/54 |
| 5,036,385 | 7/1991 | Eichenlaub | 358/3 |
| 5,083,199 | 1/1992 | Borner | 358/88 |
| 5,142,357 | 8/1992 | Lipton et al. | 358/88 |
| 5,270,751 | 12/1993 | Christian | 353/7 |
| 5,279,912 | 1/1994 | Telfer et al. | 430/17 |
| 5,330,799 | 7/1994 | Sandor et al. | 427/510 |
| 5,365,294 | 11/1994 | Anderson | 354/112 |
| 5,438,429 | 8/1995 | Haeberli et al. | 358/445 |
| 5,479,270 | 12/1995 | Taylor | 358/488 |
| 5,492,578 | 2/1996 | Morton | 156/64 |
| 5,557,413 | 9/1996 | Ebihara et al. | 358/296 |

Primary Examiner—Edward L. Coles, Sr.
Assistant Examiner—Fan Lee
Attorney, Agent, or Firm—Gordon M. Stewart

[57] ABSTRACT

An apparatus for forming an integral image element, comprising (a) a processor, (b) a printer to print an integral composite image on a carrier, the printer being capable of printing the image at a magnification which is under the control of the processor, (c) a positioning unit connected to the processor to position the printed image under control of the processor so that it can be viewed through an integral lens sheet, (d) a sensor unit connected to the processor to provide an indication of the magnification of the printed integral composite image with respect to the integral lens sheet, and (e) a magnification adjuster connected to the processor, which can vary the magnification in response to the indication. A method which can be carried out by the above apparatus, is also provided.

35 Claims, 5 Drawing Sheets

APPARATUS AND METHOD FOR PRODUCING INTEGRAL IMAGE ELEMENTS

FIELD OF THE INVENTION

The invention relates generally to the field of integral image elements which may display depth, motion or other images, and methods of making such elements.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following U.S. Pat. Nos.: 5,391,254; 5,424,533; 5,241,608; 5,455,689; 5,276,478; 5,391,254; 5,424,533 and others; as well as allowed U.S. patent application Ser. No. 07/931,744. Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images.

Integral image elements using reflective layers behind the integral image to enhance viewing of the integral image by reflected light, are also described in U.S. Pat. Nos. 3,751,258, 2,500,511, 2,039,648, 1,918,705 and GB 492,186.

In a typical method of assembling a lenticular type of integral image element, an original negative is exposed from stored digitized data of a composite lenticular image on a film writer. A suitable film writer is the Symbolic Sciences International Fire 1000 and the LVT Model 1620B, available from Light Valve Technology, a subsidiary of Eastman Kodak Company, Rochester, N.Y. A suitable negative exposure technique is disclosed in U.S. Pat. No. 5,276,478. After photographic processing, the negative is printed, typically by a projection enlarger, onto a suitable film- or paper-based photographic print stock. After processing, the lenticular composite print is coated with adhesive, aligned with a lenticular lens sheet, and pressed against the lens sheet to permanently adhere to it in proper registration with the printed lenticular composite image.

Since each of the lenses of a lenticular lens sheet is dedicated to a single image set of interleaved image lines, it is important that the lenticules be rotationally and translationally positioned with the image line sets, so that each set is parallel and aligned with a corresponding lenticule. Schemes for rotationally and translationally positioning a print with an overlay are disclosed in U.S. Pat. No. 5,479,270.

While the width of each set of image lines may be less than or equal to the width of a lenticule, and each may be centered under its corresponding lenticule, these conditions are not essential. For example, U.S. Pat. No. 5,278,608 and U.S. Pat. No. 5,276,478 describe methods in which the image sets become increasingly spaced from the centers of their respective lenticules moving from the center to the edges of the integral image element. What is typically required is that all of the lines from only a single image can be clearly viewed from an intended (that is, preselected) viewing position in front of the lenticular lens sheet. For individual integral image elements or for short runs (that only a small number of copies) of integral image elements, this has been accomplished in the known art by first accurately measuring the pitch of the lenticular lens sheet to be used. The pitch, which provides the number of lens elements over a given distance, is a measure of the size of the lenticular lens elements. The spacing of the sets of image lines in the print of the integral composite image would then be selected by a suitable magnification of the original negative.

Following selection of the magnification, the print would then be printed to provide an integral image composite print which would then be manually positioned with the lenticular lens sheet. The relative magnification of the print with respect to the lenticular lens sheet (that is, the relative actual spacing of the image line sets compared to the lenticules, versus the desired relative spacing) in the first integral image element produced by this method could then be measured. Depending upon the results of this measurement, the relative magnification could then be manually adjusted, another copy of the same integral lens element produced, and the process repeated as often as required.

A serious problem can arise, however, when the pitch of the lenticules varies within a given supply or between supplies, of lenticular lens element sheets. This becomes particularly serious on relatively long runs which produce many copies of the same lenticular image element. If the original negative magnification has been fixed at the start of a run to have a desirable match with the lenticular lens material, and the pitch of the lenticular lenses varies during the run, errors in the desired pitch match will result in inferior and unacceptable registration of printed integral composite images as the run progresses. A substantial number of unacceptable and unusable integral image elements can then occur before the problem is detected and the magnification changed to correct the change in pitch in the lenticular overlay. Of course, pitch changes in the lenticular lenses can continue to occur without warning, each time leading to waste of materials and process downtime.

It would be desirable then, to provide an improved method and apparatus which readily lends itself to automation for producing many copies of an integral (particularly, lenticular) image element. The method and apparatus should be capable of producing these elements without large numbers being unacceptable due to incorrect magnification of the integral composite image relative to the lenticular lens sheet, even when the pitch of the lenticules should change.

SUMMARY OF THE INVENTION

The present invention further realizes that while lenticular lens elements may be conveniently and rapidly prepared using a continuous lenticular lens web which is brought into confluence with a carrier web having multiple copies of an integral image thereon, such lens webs are subject to varying lenticule pitch along the web length. This could cause many unacceptable integral lens element copies to be produced unless some way of rapidly and automatically adjusting integral composite image magnification is provided, to compensate for the varying lenticule pitch.

The present invention then, provides in one aspect an apparatus for forming an integral image. The apparatus comprises:

(a) a processor;

(b) a printer to print an integral composite image on a carrier, the printer being capable of printing the image at a magnification which is under the control of the processor;

(c) a positioning unit to position the printed image under control of the processor so that it can be viewed through an integral lens sheet;

(d) a sensor unit connected to the processor to provide an indication of the magnification of the printed integral composite image with respect to the integral lens sheet; and (e) a magnification adjuster connected to the processor, which can vary the magnification in response to the indication.

In a second aspect of the present invention which particularly lends itself to producing many copies of an integral image element, a carrier web feeder provides the carrier in the form of a carrier web. A processor (typically a microprocessor, such as a suitably programmed microcomputer) is also present. The printer is positioned to print multiple copies of an integral composite image on respective portions of the carrier web as it is fed from the carrier web feeder. An integral image web feeder is positioned to feed an integral lens web into confluence with the printed carrier. A positioning unit positions the printed images so that they can be viewed through the integral lens web. The magnification adjuster can vary the magnification at which further copies of the integral composite image are printed, in response to the magnification indication.

In one aspect of the method of the present invention, the method comprises:

(a) printing an integral composite image on a carrier under the control of a processor;

(b) positioning, under the control of the processor, the printed image so that it can be viewed through an integral lens sheet;

(c) obtaining from a sensor unit, an indication of the magnification of the printed integral composite image with respect to the integral lens sheet which indication is forwarded to the processor;

(d) printing an integral composite image on a carrier under control of the processor with a magnification adjusted in response to the indication.

A second aspect of the method of the present invention comprises:

(a) printing a first copy of a lenticular composite image and a plurality of alignment features on a carrier;

(b) positioning the printed lenticular composite image and alignment features so that they can be viewed through a lenticular lens sheet;

(c) detecting a feature of the alignment features as viewed through the lenticular lens sheet to obtain an indication of the magnification of the printed lenticular composite image with respect to the lenticular lens sheet; and (d) adjusting the magnification in response to the indication.

Either aspect of the method may be particularly performed using the second aspect of the apparatus described above.

A computer program product is further provided by the present invention. In a first aspect, this computer program product comprises a computer readable storage medium including computer readable program code means comprising:

(a) means for receiving an indication of the magnification of an integral composite image, printed by a printer, with respect to an integral lens sheet;

(b) means for adjusting the magnification of the printer in response to the indication; and (c) means for stopping printing of further copies of the composite image, or activating an alarm, in response to the magnification indication being beyond a preselected tolerance.

In a second aspect, the computer readable program code means on the computer readable storage medium comprises:

(a) means for causing a printer to print an integral composite image stored in a computer memory;

(b) means for receiving an indication of the magnification of the integral composite image printed by a printer, with respect to an integral lens sheet;

(c) means for adjusting the magnification of the integral composite image stored in the memory; and (c) means for causing the printer to print a further copy of the integral composite image at the adjusted magnification.

The method and apparatus of the present invention then, can provide in a highly automated manner, many copies of an integral (particularly, lenticular) lens element. The method and apparatus can produce these copies without large numbers of which are unacceptable due to incorrect magnification of the integral relative to the lenticular lens sheet, even though the pitch of the lenticules may change during a given production run.

BRIEF DESCRIPTION OF THE DRAWINGS

To facilitate understanding, identical reference numerals have been used, where possible, to designate identical elements that are common to the figures.

EMBODIMENTS OF THE INVENTION

It will be appreciated in the present invention, that while the integral lens sheet could be a fly's eye lens sheet it is more preferably a lenticular lens sheet with lenticules on a front surface. Alternatively, the integral lens sheet could have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plane which may be inherent in the lens construction. Consequently, the curvature on the back side may be of such a shape as to match the curvature of the focal plane of the lens. Further, by an "integral" composite image is referenced an image composed of segments (interlaced lines, in the case of a lenticular composite image) from at least one complete image (and often more than one image), which segments are aligned with respective individual lenses so that each of the one or more images is viewable when a user's eyes are at the correct angle relative to the imaging element. An integral lens web may be a continuous web of any integral element lens sheet type.

In the present invention, the sensor unit could be positioned in various locations to obtain an indication of the magnification of the integral composite image (which will often be referred to herein as the "relative magnification" or simply the "magnification" of the integral composite image). However, it will preferably be positioned to view a plurality of features through the integral lens sheet and obtain the magnification indication based on the features as viewed. Such features could, for example, be features in the printed composite image itself wherein the characteristics of the lines to be viewed by the sensor unit were previously evaluated and accessible by the processor. More preferably, the features are additional alignment features which may also be printed by the printer. Such alignment features are features which are distinct from the printed image and can remain fixed over multiple copies of the same integral composite image and over different integral composite images.

Preferably the sensor unit also obtains an indication of the positioning of the integral composite image with the integral lens sheet based on the features. In this case the positioning unit is preferably connected to the processor so that it can alter the positioning in response to the positioning indication under control of the processor. It will be appreciated that the positioning unit need not necessarily be one which permits automatic adjustment of the positioning of the image with the lens sheet. For example, the positioning unit may just be a frame and feeder mechanism preset to feed the lenticular lens sheet and printed integral image into correct positioning based upon their expected characteristics. However, it is preferred that the positioning unit is connected to the processor to effect automatic positioning adjustment as described.

It will also be appreciated in the present invention that the printer could be any suitable printer for printing integral images, for example an optical printer which makes copies from an original document (such as an original negative), such as a projection lens printer or contact printer, or an LVT, LED or other type printer which under the control of a microprocessor, can print an image stored electronically (such as digitally in a computer memory). From this it will be appreciated that the variable magnification can be achieved by any means appropriate for the printer, and which will allow adjustment of the spacing between sets of image segments (that is, sets of image lines in the preferred case of a lenticular composite image). For example, in the projection lens printer the magnification of the projection lens can be varied. In a printer which could, for example, use strips of a luminescent display printing onto photosensitive film, the relative spacing of the strips could simply be adjusted to achieve variable magnification. In the case where the image being printed is printed from a digitally stored image in a computer memory, the variable magnification can be obtained by using a microprocessor the digital image in a known manner.

Figure 1:
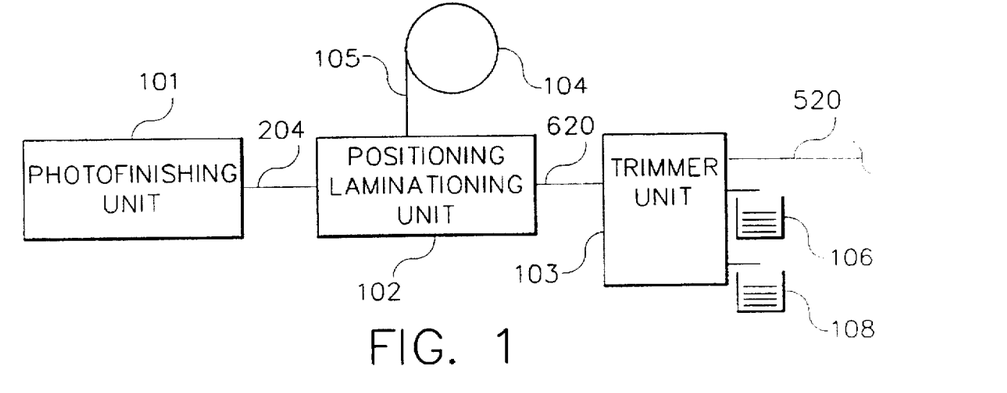
FIG. 1 is a block diagram of an apparatus of the present invention.

Referring now to the drawings, FIG. 1 shows an overall block diagram of an apparatus according to the present invention. A photofinishing unit 101, which contains a printer 200 (see FIG. 2), produces a carrier web 204 which has printed thereon successive lenticular composite images (typically multiple copies of the same image in a given run). Web 204 was originally a photographic film web which after printing and processing in photofinishing unit 101, is no longer photosensitive. Web 204 is passed from photofinishing unit 101 to a positioning and lamination 102, which laminates a lenticular lens web 105 from a lens web spool 104, onto the carrier web 204 to form a web of lenticular image elements. This laminated material then passes to a cutter and trimmer unit 103 to produce completed images in output bin 108. Unacceptable lenticular image elements are directed by unit 103 into a reject bin 106 as described in more detail below.

Figure 2:
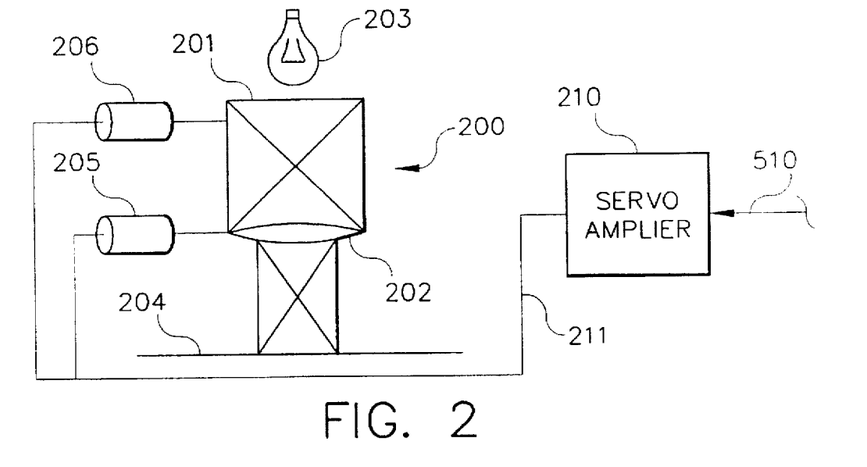
FIG. 2 shows the components of an optical printer unit of the apparatus of FIG. 1, which uses a projection lens system.

FIG. 2 shows a detailed configuration of a printer inside photofinishing unit 101. An original master negative 201, which carries a lenticular composite image thereon, is generated using exposure techniques such as described, for example, in U.S. Pat. 5,276,478. Master negative 201 can be exposed through a projection lens system 202 using illumination source 203 onto web 204 which is light sensitive at this point. The printer unit has a variable magnification and focus, which are controlled through motor 205 controlling the position of lens system 202 and a motor 206 controlling the position of film web 204. In this manner, the focus and magnification of the image projected by master negative 201 onto film web 204 can be adjusted by motors 205, 206. Motors 205, 206 are under the control of a microprocessor of a suitably programmed digital computer, as described in further detail below.

Figure 4:
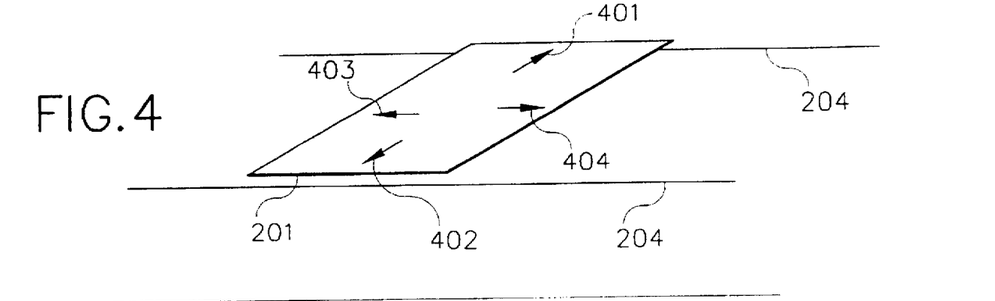
FIG. 4 illustrates an alternative optical printing method from that performed by the printer of FIG. 3, which alternative method is a contact printing method.

An alternative printer to that shown in FIG. 2, is a contact printer. A contact printing method is illustrated in FIG. 4. Master negative 201 is brought into contact with light sensitive carrier web 204, and magnification is adjusted by motor drives (not shown) which can reversibly stretch the negative 201 in the directions shown by arrows 401 and 402, and also in the directions indicated by arrows 403 and 404. This reversible variable stretching provides small variations in magnification of the lenticular composite image printed onto carrier web 204.

Figure 3:
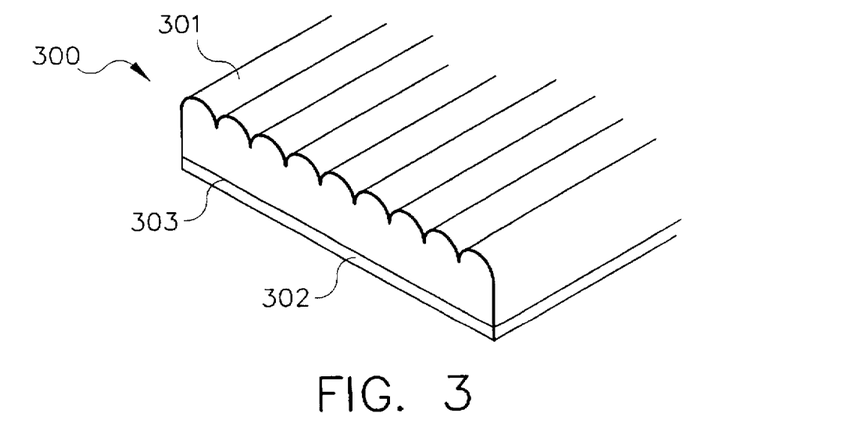
FIG. 3 is an end view of a lenticular lens element produced by the method and apparatus of the present invention.

The printer is also capable of printing a plurality of alignment features, typically in the form of spaced apart straight parallel lines 220, 222 (see FIG. 5) at the outside edges of the printed lenticular image. These lines are preferably of uniform density and color. In the case of the projection lens printer of FIG. 3 or the contact printer of FIG. 4, these alignment features can be present on the original master negative 201.

After exposure, web 204 passes to a developing section (not shown) inside photofinishing unit 101 and then passes on to laminator unit 102 where the lenticular material from spool 104 is laminated to the film web 204. The adhesive used to affix the carrier web 204 to lenticular lens web 105 can be of either of two types. One type essentially sets upon confluence of the two webs, the other type has a working time before setting and thereby allowing post confluence adjustment of the two webs with respect to one another. The second type is preferred. The integral image elements from cutter and trimmer unit 103 each appear as a lenticular image element 300 shown in FIG. 3. Element 300 comprises a lenticular lens sheet 301 (which is a portion of web 105) laminated (that is, adhered to) a carrier in the form of developed film 302 (which is a portion of web 204) with an adhesive layer 303 between sheet 301 and film 302.

Figure 5:
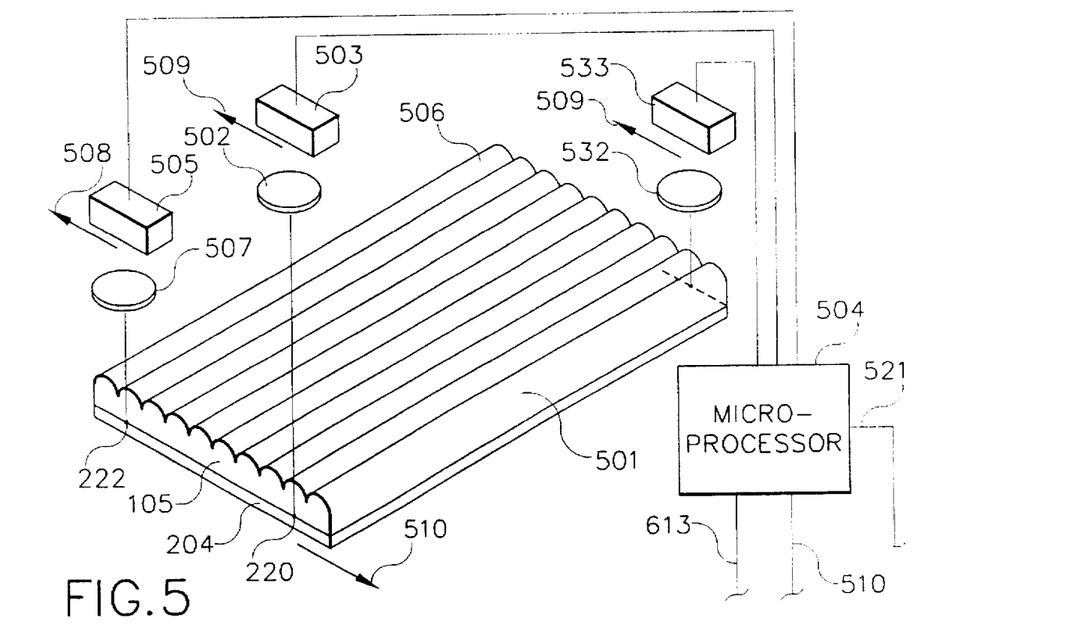
FIG. 5 illustrates the sensor unit of the apparatus of FIG. 1 and a method of obtaining an indication of the magnification and positioning of the integral composite image with respect to the lenticular lens web.

FIG. 5 illustrates an apparatus and method for sensing the magnification match of a printed lenticular composite image with the integral lens web 105. Alignment lines 220, 222 exposed on the edge of the carrier web 204 are viewed through respective lenticules. In particular line 220 is viewed by a CCD line sensor 503 through a lenticule 501 via a lens 502, and a CCD line sensor 533 through the same lenticule 501 via lens 532. The other alignment line 222 is viewed by a CCD line sensor 505 through a lenticule 506 via a lens 507. Sensor 533 is conveniently positioned at the point of confluence of the two webs (that is, the point of coming together). Sensors 503, 505 may be positioned downstream from sensor 533 and at any convenient position prior to setting of the adhesive.

Lenses 502, 507, 532 and CCD line sensors 503, 505, 533 together act as a sensing unit which is connected to a suitably programmed microprocessor 504 as shown in FIG. 5. The combined output signals from sensors 503 and 505 act as a magnification indication. The combined output signals of sensors 503 and 533 act as positioning indication. In particular, microprocessor 504 can then determine the relative positions of both of the lines 220, 222 under their respective lenticules 501, 506 and compare their relative positions to predetermined reference positions (which can be predetermined based on the positioning of lines 220, 222 in a copy of the integral image element of acceptable quality).

Figure 5A:
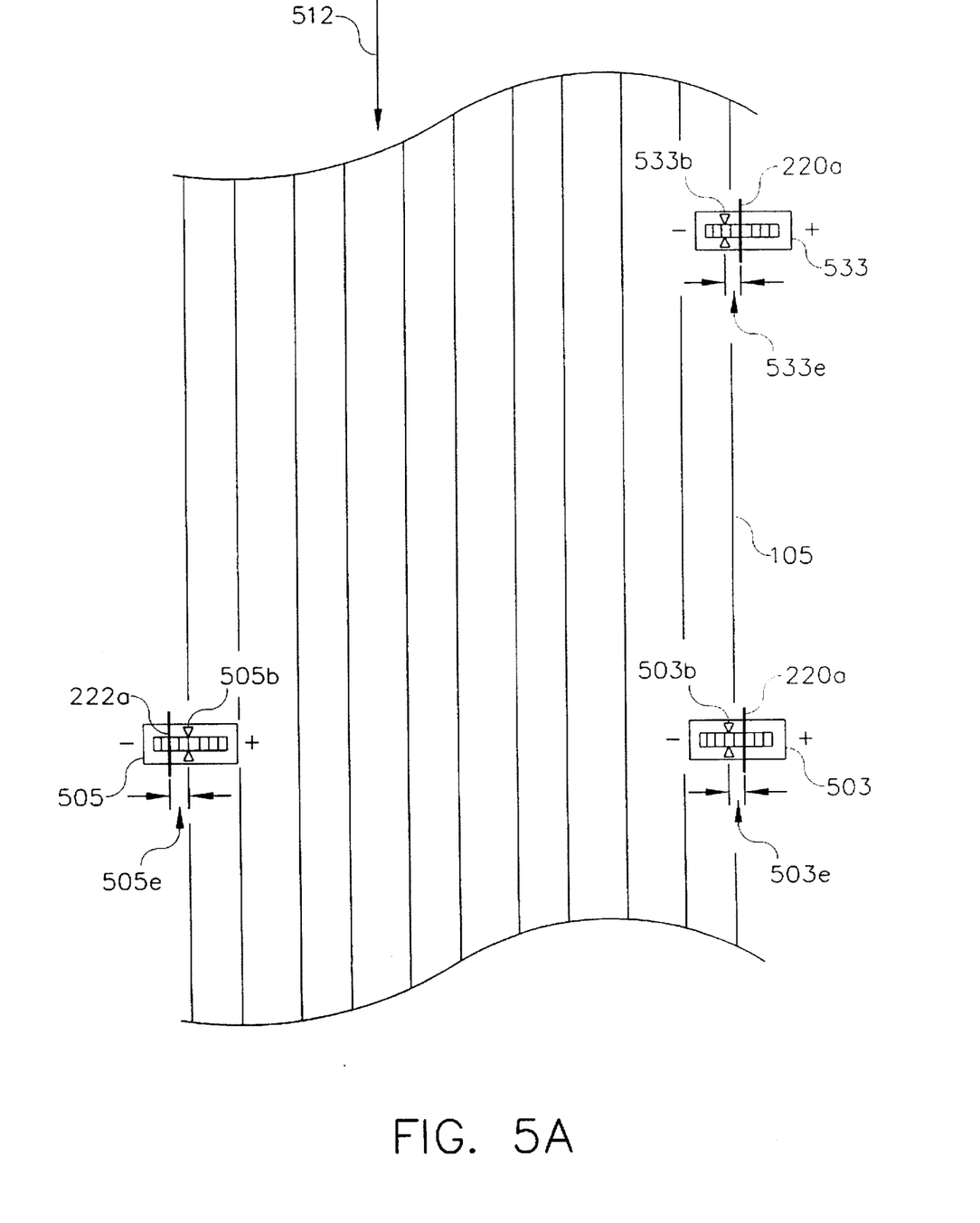
FIG. 5A is a view of the arrangement in FIG. 5 from above.

Microprocessor 504 is programmed to determine that if the two lines 220, 222 as viewed by each sensor 533 and 503 are in the same direction from their predetermined reference positions, this would indicate if the two webs were skewed (that is, at an angle along their lengths) with respect to each other. In FIG. 5A sensors 503, 505 and 533 indicate errors in a plus direction ("+" in the Figure) when the image 220a falls to the right of reference positions 503b and 533b, and when the image 222a falls to the right of reference position 505b. These errors are illustrated as 503e, 533e and 505e. Arrow 512 indicates the direction of movement of web 105 and web 204.

Positioning requires two measurements, skew and location. Together sensors 503 and 533 provide an indication of skew, and sensor 503 and 505 indicate location. Magnification requires one measurement which is provided by sensors 503 and 505. Skew error can be determined from the following equation:

$$E_p - E_r = \text{skew error}$$

where $E_p$ is the error shown as 533e and $E_r$ is the error shown as 503e. The sign of the skew error is an indication of the direction the web has to be twisted to eliminate skew. Location error can be determined from the following equation:

$$E_1 + E_r = \text{location error}$$

where $E_1$ is the error shown as 505e. The sign of the location error is an indication of the direction the web has to be moved sideways to correct location. Magnification can be determined from the following equation:

$$(-E_1 + E_r)/2 = \text{magnification error.}$$

The sign of the error is an indication of whether the original image has to be magnified smaller or larger.

To correct for location or skew errors (which are both positioning errors), microprocessor 504 generates commands for a positioning unit to relocate and steer (that is, to change skew) film web 204 with respect to the lenticular lens web 105 coming off spool 104.

Figure 6:
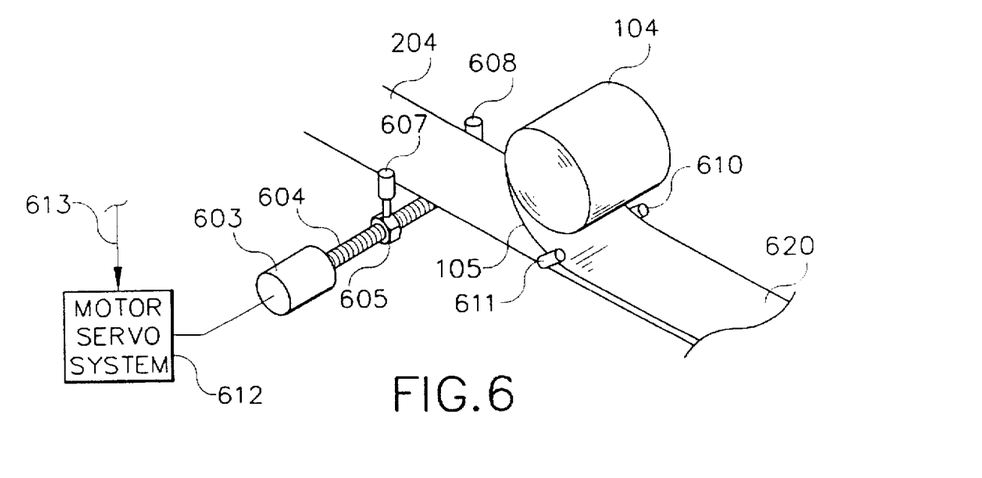
FIG. 6 is a perspective view showing the positioning unit of the apparatus of FIG. 1, and in particular the location section thereof.
Figure 7A:
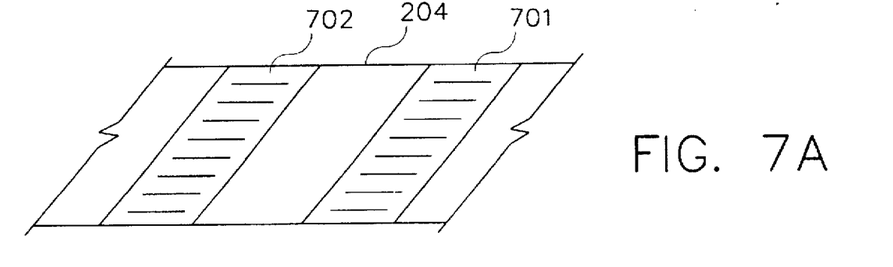
FIGS. 7A–7D illustrate an alternative method and apparatus for obtaining an indication of magnification and positioning.
Figure 7B:
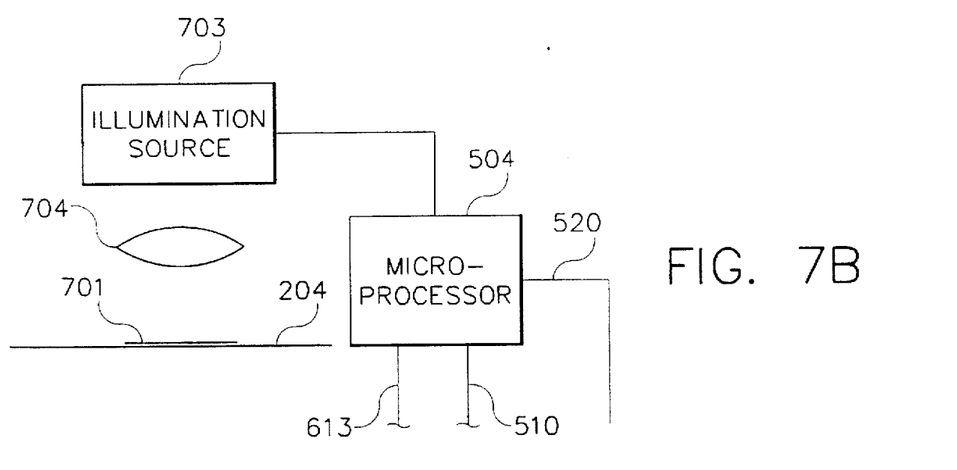
Figure 7C:
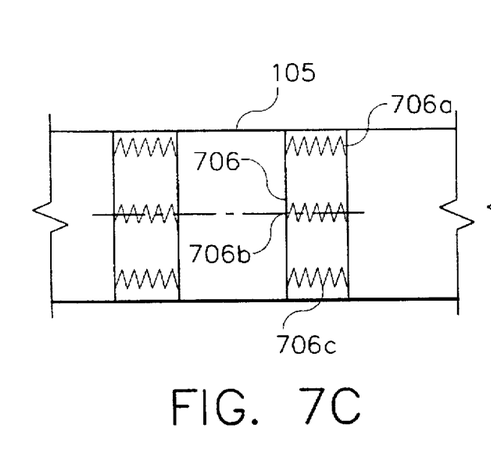
Figure 7D:
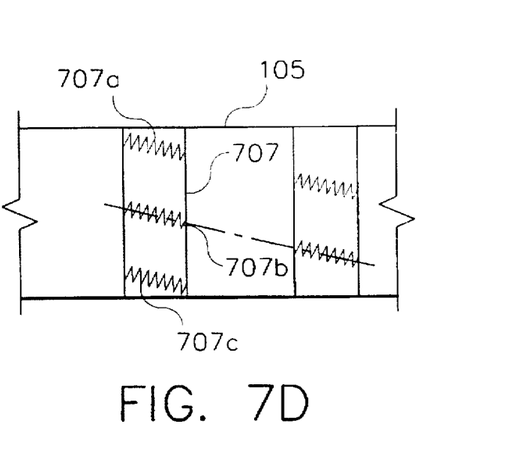

A suitable web positioning unit will require various motors, edge Guides and rollers, as is well known in the art. A simplified system is illustrated in FIG. 6, although it will be understood that other components as already mentioned, will be required. The positioning unit includes a motor 603 which controls screw thread 604 containing nuts 605 and 606 (not shown). Nut 605 Guides the position of edge Guides 607 while nut 606 guides position of edge guide 608 to laterally position web 204 prior to its engagement with lenticular lens web 105. Edge guides 610 and 611 ensure that lenticular lens web 105 maintains an accurate lateral position. Motor 603 is controlled by motor servo system 612 which is in turn controlled through line 613 from microprocessor 504. This arrangement will change lateral location of web 204 relative to lens web 105. However, further motor(s) and rollers (not shown) will be required to adjust skew, in a known manner.

To correct for changes in magnification so that the size of the lenticular material is always matched with the size of the printed material 204, a signal is generated by processor 504 on line 510. This signal is generated as described earlier.

The signal on line 510 passes to a servo amplifier 210 which controls motors 205 and 206 through line 211. These motor positions are adjusted by servo amplifier 210 in such a way that the magnification of the optical system comprising lens system 202 is changed (while maintaining focus). The resulting change in magnification brings the lenticular composite image printed on web 204 back into size agreement with lenticular lens web 105. For example, if the sign of the magnification error is positive, this indicates that the magnification of the image on web 204 needs to be decreased and the signal on line 510 correspondingly causes motors 206 and 205 to decrease the magnification while maintaining focus.

In summary, therefore, whenever the reference images on CCD 505 and 503 move in the direction of arrows 508 and 509 simultaneously or when the images move in directions opposite to both 508 and 509, the location error is calculated as described earlier and results in an error correction signal being generated on line 613 further resulting in motor 603 correcting the position of web 204 before it engages with lenticular material 601. Whenever a magnification error is determined by processor 504 (from CCD 505 and CCD 503), the error signal on line 510 is activated. It will be appreciated that these correction signals do not have the effect of immediately correcting the magnification (or for that matter, the positioning) of the lenticular composite image on web 204 as it engages with lenticular lens web 105 since the sensors 503, 505 are located to view lines 220, 222 at a position slightly beyond the point of confluence between lenticular lens web 105 and web 204. However, these correction signals do have the effect of insuring that subsequent images on the web 204 are in both correct position and correct magnification. It will also be appreciated that simply because an error is detected in the relative positioning and magnifications by the sensor assembly shown in FIG. 5, this does not necessarily mean that the resulting product is out of specification. However, if the magnification or positioning errors as determined by processor 504, then line 520 (which is connected to unit 103) can be used to generate a control signal indicating that this section of the assembled material must be rejected and therefore cut out by the cutter and trimmer unit 103.

An alternative method for sensing positioning and magnification of the completed image is shown in FIG. 7. In this case the printer prints on web 204 alignment features in the form of a plurality of spaced apart straight parallel lines in areas 701 and 702. These lines are preferably of constant color or density (preferably both) and are spaced with a spacing which is slightly different from the spacing between image lines of the same view behind the lenticules and different from the spacing of the lenticules. These lines, when seen through the lenticular lens web 105, will form a Moire pattern. A 2-dimensional CCD array sensor 703 is positioned at or after the confluence of lens web 105 and printed carrier 204, so that sensor 703 can view the areas 701, 702 through lens 704 (sensor 703 and lens 704 together acting as a sensor unit). Any fringes formed by the alignment lines in areas 701, 702 as viewed through lens web 105 are analyzed by a suitably programmed processor 504 to determine if the positioning and magnification of a printed lenticular composite image needs correction. The positioning is determined by analyzing fringe patterns such as fringe pattern 706. Fringe pattern centering with respect to the edges of web 105 provides an indication of location of the lenticular image relative to web 105. Skew errors can be determined from the angle of individual fringes with respect to the edge of web 105. For example, the angle of fringes 707a, 707b and 707c in pattern 707 indicates a skew error. Magnification can be determined from the spacing of fringes within a given pattern, for example the spacing of fringes 706a, 706b and 706c in pattern 706. Processor 504 generates positioning and magnification correction signals on lines 613 and 510, respectively, as determined from an analysis of the fringe patterns. These signals accomplish positioning and magnification corrections of subsequent lenticular composite images in the same manner as described in connection with the sensor unit embodiment of FIG. 5. A signal is activated on line 521 whenever the processor 504 determines if the fringe pattern indicates that this area of the web is out of specification, in the same manner as described in connection with the sensor unit embodiment of FIG. 5.

The correctly positioned webs 105 and 204, following lamination in positioning and lamination unit 102, is then a completed integral image web 620 in FIG. 6. Web 620 passes from positioning and lamination unit 102 to trimmer unit 103. Trimmer unit 103 uses a combination of slit, shear, and laser cutting to trim the alignment lines 220, 222 or in areas 701, 702, 706, 707 and the like, off integral image web 620 and also trims the individual integral image elements to the required sizes. Unit 103 also contains a means to eject into bin 106 reject items based on signal 520 indicating that these items were out of specification tolerances from an positioning or magnification viewpoint.

Figure 8:
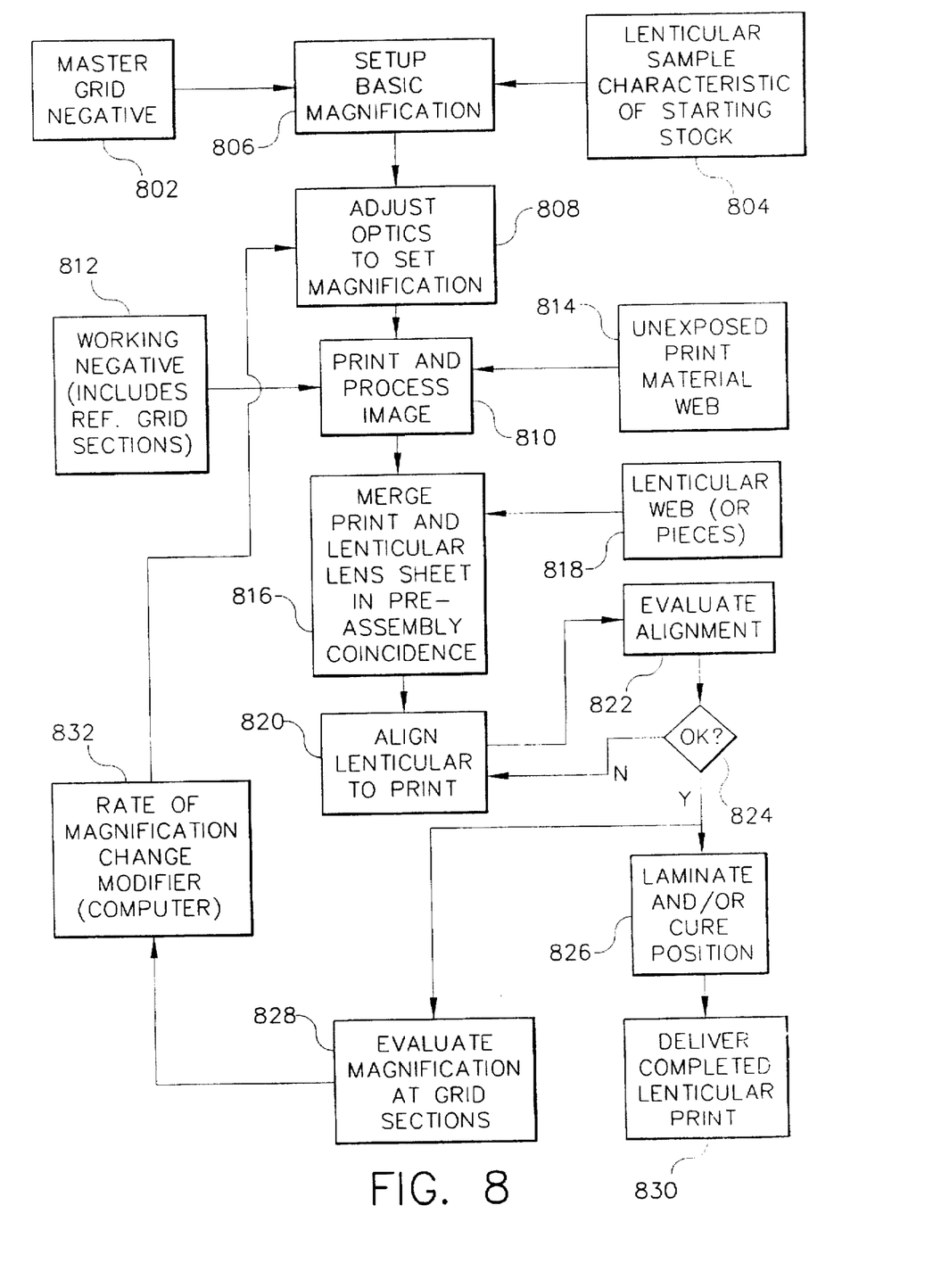
FIG. 8 is a flow chart illustrating a method of the present invention.

The overall method of the present invention is best illustrated by the flow chart of FIG. 8. Referring to FIG. 8 at the start of the process data 802 describing the master original lenticular composite image, such as negative 201 in FIG. 2, is input to suitably programmed microprocessor 504. Additionally, data 804 describing the lenticular pitch at the start of lenticular lens web 105 on spool 104 as well as other relevant information (for example, the width of the lenticular lens web, length, and the like) is also input to microprocessor 504. Microprocessor 504 then determines 806 an appropriate initial magnification for original negative 201, and sends an appropriate signal over line 510 to servo amplifier 210 to adjust 808 lenticular composite image magnification (that is, the magnification of original negative 201) in the manner already described. A first copy of a lenticular composite image is then printed and processed 810 as described above using 812 the original negative 201 and using 814 the unexposed carrier web 204.

Lenticular web 105 is then input 818 into the process and the printed carrier web 204 and lenticular lens web 105 are brought into confluence 816 (that is, they are merged or positioned together so that the printed lenticular composite images can be viewed through the lenticular lens web 105) in positioning and lamination unit 102. An initial positioning of webs 204 and 105 is made, 820, by microprocessor 504 which adjusts motor 603 in the positioning unit as described above, to a position predetermined to be a good initial setting. This positioning is then evaluated 822 by either sensor unit described above viewing the alignment lines through the lenticular lens web 105, prior to the webs 204 and 105 being adhered together by either lamination or adhesive curing. If the positioning is not correct (as monitored by the sensor unit and microprocessor), it can be further positioned 820, and the loop repeated until correct positioning is obtained at step 824. Following this, the webs 204 and 105 can be adhered together 826 by lamination or adhesive curing. The sensor unit can then measure the positions of the alignment lines once again and microprocessor then evaluates 828 the magnification of the first copy of the lenticular composite image with respect to the lenticular lens sheet. The completed lenticular print can then be delivered 830. If a change in the relative magnification is detected 832 (such as may result from a change in lenticule pitch in lenticular lens web 105) by the microprocessor, then magnification may again be adjusted 808 as determined by microprocessor 504 so that subsequent copies of the lenticular composite image will have a correct magnification relative to web 105. The programming of microprocessor 504 will also preferably evaluate the rate of change of the relative magnification so as to optimally adjust the hysterisis of the control loop.

Processor 504 can also be programmed to perform other related tasks. For example, processor 504 may be programmed with code such that when a magnification and/or positioning error is detected which is beyond a tolerance preselected by a user, processor 504 will activate an alarm (such as an audible alarm, or a visible alarm in the form of a warning message on a CRT or other monitor) or stop the production of integral image elements.

It will be appreciated that in the present invention, the referenced computer readable storage medium may comprise, for example: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

The formation of suitable lenticular composite images by interlacing lines from different scenes, and their exposing or writing to the back side of integral imaging elements, is described for example, in U.S. Pat. Nos. 5,278,608, 5,276,478 and 5,455,689. The integral image can, for example, be made of two or more images of a scene taken at different perspectives (that is, at different angular positions with respect to the scene). Such an integral image, when recorded on the light sensitive layer and viewed from a position forward of the front side of the lenticular lens sheet, may provide one or more three-dimensional images. By a "three-dimensional image", is meant an integral image which, when viewed through the front side of the lens sheet (that is viewed through the lens elements), has a visible depth element as a result of the various views being relational configured to appear as the views that would be seen from different positions when actually viewing a three-dimensional object. A depth element means the ability to at least partially look around an object in the scene. This can be obtained by interlacing lines from different perspective views of the same scene, in a known manner. Thus, a three-dimensional image necessarily includes at least two views of a scene. Alternatively or additionally, the integral image may contain one or more two-dimensional images which may be recorded in alignment with the lens sheet so as to be viewable when the lenticules are angularly positioned horizontally or vertically with respect to the user's eyes.

The invention has been described with reference to a preferred embodiment. However, it will be appreciated that variations and modifications can be effected by a person of ordinary skill in the art without departing from the scope of the invention.

| PARTS LIST | |
| --- | --- |
| 101 | Photofinishing Unit |
| 102 | Positioning and Lamination Unit |
| 103 | Trimmer Unit |
| 104 | Spool |
| 105, 204 | Webs |
| 106 | Rejection Bin |
| 108 | Output Bin |
| 200 | Printer |
| 201 | Master Negative |
| 202 | Projection Lens System |
| 203 | Illumination Source |
| 205, 206 | Motor |
| 210 | Servo Amplifier |
| 211, 220, 222, | Lines |
| 220a | Image |
| 300 | Element |
| 301 | Lenticular Lens Sheet |
| 302 | Film |
| 303 | Adhesive Layer |
| 401, 402, 403, 404 | Arrows |
| 501, 506 | lenticules |
| 502, 507, 532 | lenses |
| 503, 505, 533 | CCD line sensors |
| 503b, 505b, 533b | Reference Position |
| 503e, 505e, 533e | $E_r$ is the error shown as |
| 504 | Microprocessor |
| 508, 509, 512 | Arrows |
| 510, 520, 521, 613 | lines |
| 603 | Motor |
| 604 | Screw Thread |
| 605, 606 | Nuts |
| 607, 608, 610, 611 | Edge Guides |
| 612 | Motor Servo System |
| 620 | Web |
| 701, 702 | Areas |
| 703 | CCD Array Sensor |
| 704 | Lens |
| 706, 707 | Fringe Pattern |
| 706a, 706b, 706c | Fringes |
| 707a, 707b, 707c | Fringes |
| 802, 804 | Data |
| 806 | Steps |
| 808 | Lenticular Composite Image |
| 810 | Steps |
| 812 | Steps |
| 814 | Steps |
| 816 | Steps |
| 818 | Steps |
| 820 | Steps |
| 822 | Steps |
| 824 | Step |
| 826 | Steps |
| 828 | Steps |
| 830 | Steps |
| 832 | Steps |

We claim:

1. An apparatus for forming an integral image element, comprising:

(a) a processor;
   (b) a printer to print an integral composite image on a carrier, the printer being capable of printing the image at a magnification which is under the control of the processor;
   (c) a positioning trait connected to the processor to position the printed image under control of the processor so that it can be viewed through an integral lens sheet;
   (d) a sensor unit connected to the processor to view features which have been printed by the printer on the carrier and, based on the viewed printed features, provide an indication of the magnification of the printed integral composite image with respect to the integral lens sheet; and
   (e) a magnification adjuster connected to the processor, which can vary the magnification in response to the indication.

2. An apparatus according to claim 1 wherein the sensor can view, through the integral lens sheet, a set of features which have been printed by the printer on the carrier to provide the indication.

3. An apparatus according to claim 2 wherein the printer prints a lenticular composite image and the positioning unit positions the printed image so that it can be viewed through a lenticular lens sheet.

4. An apparatus according to claim 1 wherein:

the printer can additionally print a plurality of alignment features on the carrier;
   the positioning unit positions the printed integral composite image and alignment features so that they can be viewed through an integral lens sheet;
   the sensor unit detects the positioning of the alignment features which have been printed by the printer, with respect to the integral lens elements and provides an indication of the magnification of the printed integral composite image with respect to the integral lens sheet.

5. An apparatus according to claim 4 wherein the printer prints a lenticular composite image and the positioning unit positions the image and alignment features which have been printed by the printer so that they can be viewed through a lenticular lens sheet.

6. An apparatus according to claim 5 wherein the sensor unit provides the magnification indication based on alignment features which have been printed by the printer as viewed through the lenticular lens sheet.

7. An apparatus according to claim 5 wherein the alignment features are lines which have been printed by the printing unit parallel to image lines of the lenticular composite image.

8. An apparatus according to claim 7 wherein the sensor unit detects the apparent spacing of the alignment lines which have been printed by the printer, as viewed through the lenticular lens elements and provides an indication of the magnification of the printed lenticular composite image with respect to the lenticular lens sheet based on the difference between the apparent spacing and a preselected reference value.

9. An apparatus according to claim 7 wherein the sensor unit detects a Moire pattern of the lines viewed through the lens sheet and provides the indication based on the pattern.

10. An apparatus according to claim 9 wherein the sensor unit detects the number of fringes in the Moire pattern over an area.

11. An apparatus according to claim 7 wherein the sensor unit detects the angular position of the viewed lines with respect to a normal to both the plane of the lenticular faceplate and the direction of the lenticules.

12. An apparatus according to claim 5 wherein the printer is an optical printer and can print at variable magnification through a projection lens system.

13. An apparatus according to claim 1 wherein the sensor unit also provides an indication of the positioning of the integral composite image which has been printed by the printer with respect to the integral lens sheet, and the positioning unit can alter the positioning of the integral composite image with the integral lens sheet in response to the positioning indication.

14. An apparatus according to claim 1 wherein the printer is an optical printer and the printer can print at variable magnification through a projection lens system.

15. An apparatus according to claim 1 wherein the printer is a contact printer and can print at variable magnification by a means for mechanically stretching an original image element to be printed onto the carrier.

16. An apparatus according to claim 1 additionally comprising a lamination unit positioned to adhere the integral composite image to the integral lens sheet before the sensor unit provides the indication of magnification.

17. An apparatus for forming an integral image element, comprising:
 (a) a carrier web feeder;
 (b) a processor;
 (c) a printer positioned to successively print multiple copies of an integral composite image on respective portions of the carrier as it is fed from the carrier web feeder, the printer being capable of printing the image at a variable magnification which is under the control of the processor;
 (d) an integral lens web feeder positioned to feed an integral lens web into a confluence with the printed carrier;
 (e) a positioning unit to position the printed images so that they can be viewed through the integral image lens web;
 (f) a sensor unit positioned at or after the confluence and connected to the processor to provide an indication of the magnification of a copy of the integral composite image which has been printed by the printer with respect to the integral lens sheet; and
 (g) a magnification adjuster connected to the processor, which can vary the magnification at which further copies of the integral composite image are printed, in response to the indication.

18. An apparatus according to claim 17 wherein the sensor unit additionally provides an indication of the positioning of the copy of the integral composite image which has been printed by the printer with the integral lens web, and wherein the positioning unit is connected to the processor so that the positioning unit can alter the positioning of further copies with the web under control of the processor in response to the positioning indication.

19. An apparatus according to claim 17 wherein the integral composite image is a lenticular composite image and the integral lens web is a lenticular lens web.

20. An apparatus according to claim 17 wherein:
 the printer can additionally print a plurality of alignment features on the carrier;
 the positioning unit positions the integral composite image and alignment features which have been printed on the carrier by the printer so that they can be viewed through the integral lens web;
 the sensor unit detects the positioning of the alignment features which have been printed on the carrier by the printer with respect to the integral lens web and provides the indication of the magnification of the printed integral composite image with respect to the integral lens web.

21. A method of forming an integral image element comprising the steps of:
 (a) printing an integral composite image on a carrier under the control of a processor;
 (b) positioning, under the control of the processor, the printed image so that it can be viewed through an integral lens sheet;
 (c) obtaining from a sensor unit, an indication of the magnification of the integral composite image which has been printed on the carrier with respect to the integral lens sheet which indication is forwarded to the processor; and
 (d) printing an integral composite image on a carrier under control of the processor with a magnification adjusted in response to the indication.

22. A method according to claim 21 wherein the integral composite images are lenticular composite images and the integral lens sheet is a lenticular lens sheet.

23. A method according to claim 21 wherein the integral composite image printed in step (d) is a second copy of the same integral composite image printed in step (a).

24. A method of forming a lenticular image element comprising the steps of:
 (a) printing a first copy of a lenticular composite image and a plurality of alignment features on a carrier;
 (b) positioning the lenticular composite image and alignment features which have been printed by the printer on the carrier so that they can be viewed through a lenticular lens sheet;
 (c) detecting a feature of the alignment features which have been printed by the printer on the carrier as viewed through the lenticular lens sheet to obtain an indication of the magnification of the printed lenticular composite image with respect to the lenticular lens sheet; and
 (d) adjusting the magnification in response to the indication.

25. A method according to claim 24 wherein the alignment features are separated from a lenticular composite image by an intervening space with no printing.

26. A method according to claim 25 wherein the alignment features are laterally separated lines.

27. A method according to claim 24 additionally comprising printing a second copy of the lenticular composite image following step (d).

28. A method according to claim 27 additionally comprising obtaining an indication of the positioning of the integral composite image which has been printed on the carrier by the printer with the integral lens sheet based on alignment features as viewed through the lenticular lens sheet, and altering the positioning of the integral composite image with the integral lens sheet in response to the positioning indication.

29. A method according to claim 28 wherein the positioning is altered prior to obtaining the indication of the magnification.

30. A method of forming an integral image element, comprising the steps of:
 (a) feeding a carrier web to a printer;
 (b) printing multiple copies of an integral composite image on respective successive portions of the carrier web, using a printer being capable of printing the image at a variable magnification which is under the control of a processor;

(c) feeding an integral image lens web into confluence with the printed carrier, and positioning the lens web and printed carrier with respect to one another, under control of the processor, so that the images which have been printed by the printer on the carrier web can be viewed through the integral image lens web;

(d) obtaining from a sensor unit connected to the processor, an indication of the magnification of a copy of the integral composite image which has been printed by the printer on the carrier web with respect to the integral lens web; and (e) adjusting the magnification at which further copies of the integral composite image are printed, in response to the indication.

31. A method according to claim 30 additionally comprising obtaining from the sensor unit an indication of positioning of a copy of the printed integral composite image which has been printed by the printer on the carrier web, with respect to the lenticular lens web, and automatically adjusting the positioning in response to the positioning indication.

32. A method according to claim 31 additionally comprising adhering the copy of the printed integral composite image to the lens web following the positioning, and wherein the magnification indication is obtained after the adhering.

33. A method according to claim 30 wherein the processor can stop the feeding of the carrier web and integral image lens web, or activate an alarm, in response to a magnification indication which is beyond a preselected tolerance.

34. A computer program product, comprising a computer readable storage medium including computer readable program code means comprising:

(a) means for receiving an indication of the magnification of an integral composite image which has been printed by a printer, with respect to an integral lens sheet;

(b) means for adjusting the magnification of the printer in response to the indication; and (c) means for stopping printing of further copies of the composite image, or activating an alarm, in response to the magnification indication being beyond a preselected tolerance.

35. A computer program product, comprising a computer readable storage medium including computer readable program code means comprising:

(a) means for causing a printer to print an integral composite image stored in a computer memory;

(b) means for receiving an indication of the magnification of the integral composite image which has been printed by a printer, with respect to an integral lens sheet;

(c) means for adjusting the magnification of the integral composite image stored in the memory; and (c) means for causing the printer to print a further copy of the integral composite image at the adjusted magnification.

* * * * *

UNITED STATES PATENT AND TRADEMARK OFFICE
CERTIFICATE OF CORRECTION

PATENT NO. : 5,731,883
DATED : Mar. 24, 1998
INVENTOR(S) : Roger Roy Adams Morton and Roy Yuille Taylor It is certified that error appears in the above-indentified patent and that said Letters Patent is hereby corrected as shown below:

Column 12, line 6, delete "trait" and insert --unit--.

Column 14, line 63, delete "dement" and insert --element--.

Signed and Sealed this

Twenty-first Day of July, 1998

*Attest:*

BRUCE LEHMAN

*Attesting Officer*     *Commissioner of Patents and Trademarks*